May 11, 1971   K. J. CLEEREMAN ET AL   3,578,549
EXPANDABLE PLASTIC ARTICLES
Original Filed Aug. 26, 1966
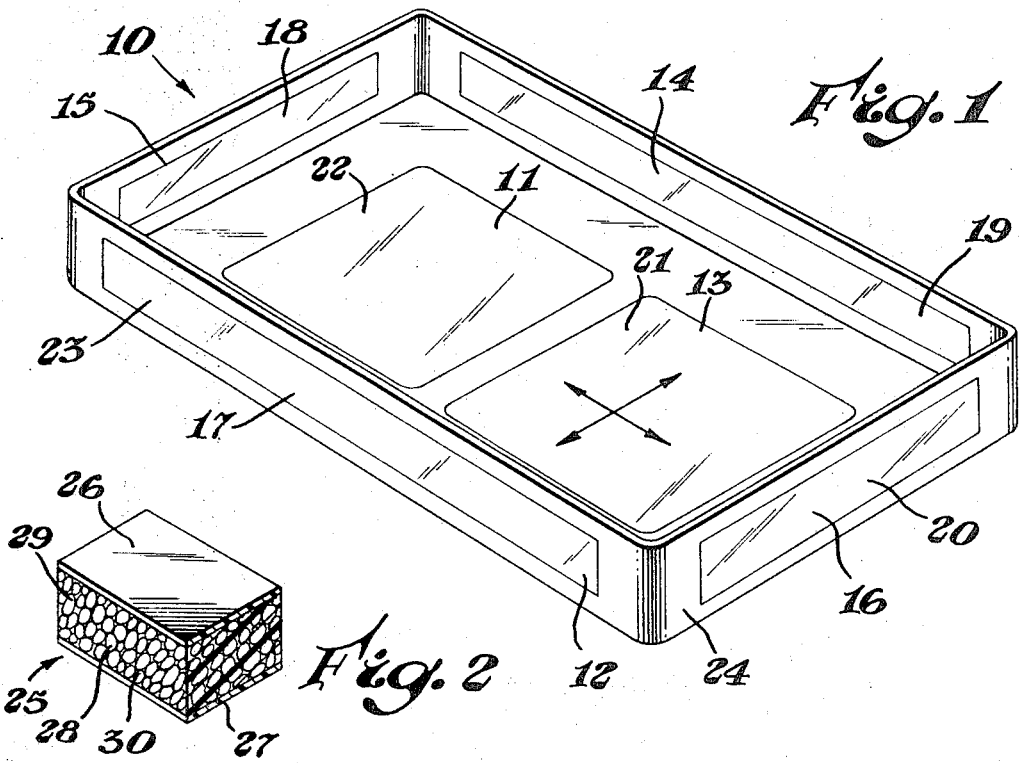
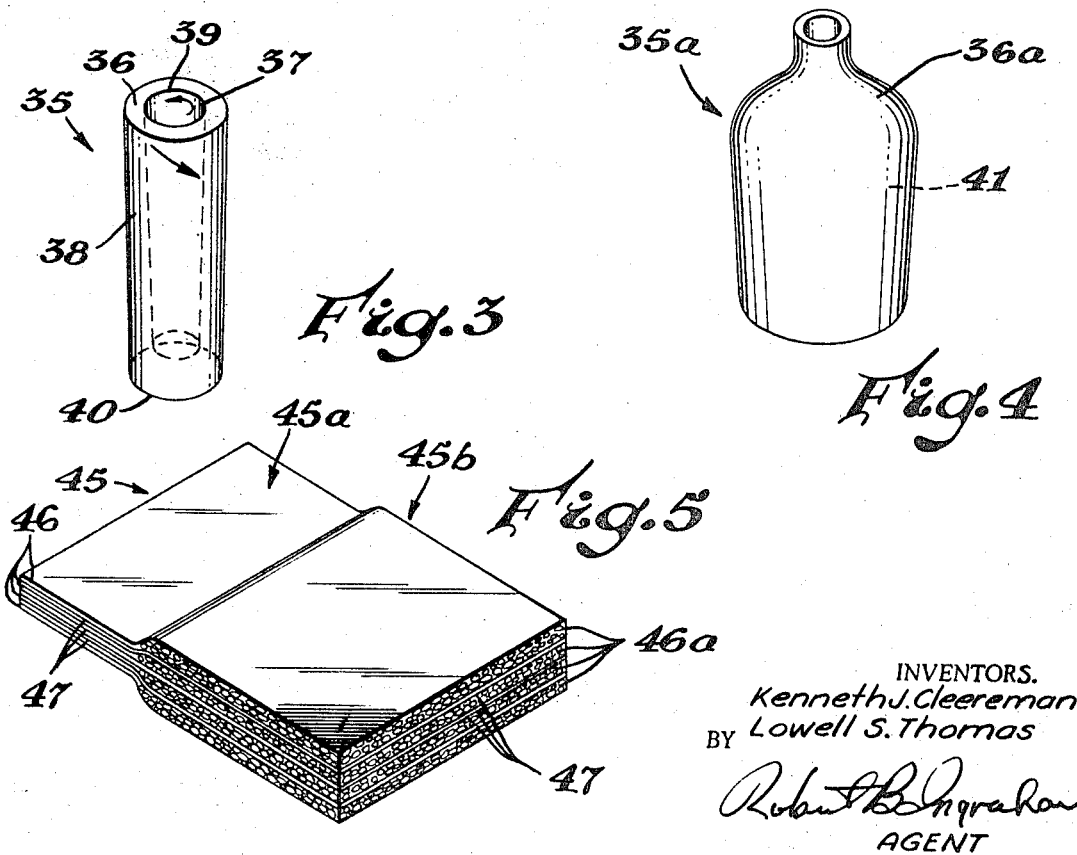
INVENTORS.
Kenneth J. Cleereman
Lowell S. Thomas
BY
Robert B. Ingraham
AGENT _United States Patent Office_

3,578,549
Patented May 11, 1971

3,578,549
EXPANDABLE PLASTIC ARTICLES
Kenneth J. Cleereman and Lowell S. Thomas, Midland,
Mich., assignors to The Dow Chemical Company, Midland, Mich.
Original application Aug. 26, 1966, Ser. No. 575,282.
Divided and this application Nov. 24, 1969, Ser.
No. 877,594
Int. Cl. B32b 3/02, 5/18
U.S. Cl. 161—160         8 Claims

ABSTRACT OF THE DISCLOSURE

Expandable synthetic resinous sheets are provided which have major expansion in only one direction. The limited expansion is obtained by employing axially oriented sheets.

---

This application is a divisional application of our co-pending application Ser. No. 575,282, filed Aug. 26, 1966, now abandoned.

This invention relates to expandable synthetic resinous articles, and more particularly relates to synthetic resinous articles which expand generally in one direction.

Many synthetic resinous expandable bodies are known. Such expandable bodies most frequently are prepared by the inclusion of a blowing or raising agent within a mass of synthetic thermoplastic resinous material, raising such a mass to a temperature which causes heat plastification thereof and devolatilization or decomposition of the raising or foaming agent to provide an article composed of a plurality of closed cells. Such foamed articles are well known and widely used in commerce. Oftentimes, it is desirable to expand synthetic resinous bodies of a predetermined configuration and subsequently cause them to be foamed at a later date. For example, it would be desirable if there were available a synthetic resinous thermoplastic sheet which could be heat plastified in an unexpanded form which would subsequently expand and be capable of pressure forming. By "pressure forming" is meant vacuum forming, blow molding and the like. One significant and substantial difficulty exists with such a sheet or article and that is when it is subjected to sufficient heat to cause it to foam, it expands generally isotropically, that is, in all three dimensions. Such a phenomenon is most undesirable for example in a vacuum forming operation where a sheet is confined or restrained about its periphery and the central portion raised to a heat plastifying and foaming temperature. The result is that the sheet expands both in thickness as well as length and width, oftentimes causing undesired wrinkles and non-uniform heating due to sagging of the sheet away from a generally planar heating platen. Similarly, in the preparation of blow molded articles such as hollow containers, uncontrolled foaming of a prefabricated parison results in a parison which is too large to fit the mold or oftentimes results in undesired contact of the foamed parison with the mold prior to blowing and a non-uniform container.

Frequently, it is desirable to prepare synthetic resinous foamable bodies which may be selectively foamed for decorative utilitarian purposes. A high degree of foaming with a non-expandable synthetic resinous body oftentimes results in undesired distortion of the foamed area rather than a generally uniform increase in the thickness thereof.

It is an object of this invention to prepare an improved expandable synthetic resinous article.

A further object of the invention is to provide an improved expandable synthetic resinous sheet which may be thermoformed without undue distortion.

A further object of the invention is to provide an improved synthetic resinous expandable sheet which may be selectively foamed without undue distortion.

A further object of this invention is to provide a synthetic resinous thermoplastic expandable article in which the major portion of the expansion occurs in one direction.

Articles in accordance with the present invention are obtained by providing a multidirectional molecularly oriented synthetic resinous thermoplastic body having molecular orientation in at least a first direction and a second direction, the thermoplastic resinous body containing a foaming agent which is generally a non-solvent for the resinous body, subsequently heating the synthetic resinous body to a temperature sufficiently high to cause the body to form a plurality of individual cells and expand in a third direction generally normal to the directions of molecular orientation.

Also contemplated within the scope of the present invention is an expandable synthetic resinous article comprising a multidirectional molecularly oriented synthetic resinous body having molecular orientation in a first and a second direction.

Articles in accordance with the present invention are readily prepared from a wide variety of synthetic resinous thermoplastic materials. Those materials which may be utilized in the practice of the present invention are those which are thermoplastic and may have a foaming agent incorporated therein. The synthetic resinous materials must also be thermoplastic. Such thermoplastic resinous materials include orientable alkenyl aromatic resins. By "alkenyl aromatic resin" is meant a solid polymer of one or more polymerizable alkenyl aromatic compounds. The polymer or copolymer comprises, in chemically combined form, at least 50 percent by weight of at least one alkenyl aromatic compound having the general formula

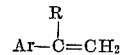

wherein Ar represents an aromatic hydrocarbon radical, or an aromatic halohydrocarbon radical of the benzene series, and R is hydrogen or the methyl radical. Examples of such alkenyl aromatic resins are the solid homopolymers of styrene, α-methylstyrene, ortho-methyl-styrene, meta-methylstyrene, para-methylstyrene, ar-ethylstyrene, ar-vinylxylene, ar-chlorostyrene or ar-bromostyrene; the solid copolymers of two or more of such alkenyl aromatic compounds with minor amounts of other readily polymerizable olefinic compounds such as divinylbenzene, methylmethacrylate or acrylonitrile, etc.

Also useful in the practice of the present invention are synthetic linear polyesters prepared by reacting terephthalic acid, dialkyl terephthalates, or ester-forming derivatives thereof with a glycol of the series $HO(CH_2)_nOH$, where $n$ is a whole number within the range of 2–10. They may also include up to 20 percent by weight of a second acid or ester thereof, said second acid being selected from the group consisting of isophthalic acid, dibenzoic acid, hexa-hydroterephthalic acid, adipic acid, sebacic acid, azelaic acid, naphthalic acid, 2,5-dimethyl terephthalic acid, and bis-p-carboxyphenoxy ethane.

The practice of the invention is also successful with other thermoplastic resinous materials well known to the art, including those which may be comprised of polymers and copolymers of methyl methacrylate, such as its homopolymer and the copolymers thereof with vinylidene chloride; thermoplastic polymers and copolymers of vinyl chloride, including homopolymeric vinyl chloride, thermoplastic ester and ether derivatives of cellulose including cellulose acetate, cellulose propionate, cellulose acetate butyrate, ethyl cellulose and the like, chlorinated polyolefins such as chlorinated polyethylene, chlorinated polypropylene and the like, as well as saran resins, which include thermoplastic copolymers of vinylidene chloride with one or more such monomers as vinyl chloride, acrylates and esters such as ethyl acrylate, propylate and the like.

The volatile fluid foaming agents can be a saturated aliphatic hydrocarbon such as butane, isobutane, pentane, neopentane, hexane, heptane or mixtures of one or more such aliphatic hydrocarbons having a molecular weight of at least 56 and a boiling point not higher than 95° C. at 760 millimeters absolute pressure. Other suitable fluid foaming agents are the perchlorofluorocarbons such as:

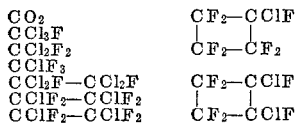

and tetraalkyl silanes such as tetramethylsilane, trimethylethylsilane, trimethylisopropylsilane and trimethyl n-propylsilane, having a boiling point not higher than 95° C. at 760 millimeters absolute pressure. The volatile fluid foaming agent is employed in amounts corresponding to from about 0.05 to 0.4 gram molecular proportion of the volatile fluid compound per 100 grams by weight of the normally solid thermoplastic polymer starting material.

An excellent blowing agent which may be used in the process is azoisobutyric dinitrile. Other nitrogen-producing blowing agents which may be used are alpha, alpha'-azobisisobutyronitrile, diazoaminobenzene, 1,3-bis(p-xenyl)-triazene, etc. Nitrogen-producing blowing agents are preferred; however, blowing agents which produce other gases such as ammonia or carbon dioxide may be employed. Commonly used blowing agents which produce these gases are sodium bicarbonate and oleic acid, ammonium carbonate, mixtures of ammonium chloride and sodium nitrite, etc. The foaming agents may be employed either singly or in admixture. The selection of the foaming agent is made in accordance with principles well known in the art as each synthetic resinous thermoplastic caterial generally has an optimum foaming temperature and the materials employed therein as raising agents are somewhat dependent on the physical characteristics of the particular thermoplastic material.

Multidirectional molecular orientation may be introduced into the articles in any of several ways well known in the art. For example, sheet materials are readily biaxially molecularly oriented by tentering, by simultaneously stretching a tube in two directions such as the trapped bubble process, by alternately stretching sheet in a transverse direction and longitudinal direction. Multidirection molecular orientation may be obtained by molding a heat plastified body of synthetic resinous material in a mold having a generally circular configuration, the sides of the mold are rotated relative to each other during cooling of the material to the solid state.

Usually, the blowing agent or foaming agent may be incorporated within the synthetic resinous material at any stage of manufacture of the article prior to its foaming. For example, liquid or fluid foaming agents such as the halogenated hydrocarbons or low molecular weight hydrocarbons, that is, hydrocarbons containing up to about 5 carbon atoms in the molecule, are readily incorporated in the polymerization reaction wherein the monomeric materials to form the resin are polymerized in the presence of such agents and a portion of the foaming agent present is entrapped within the polymer formed. The polymer may then be processed under heat pressure without foaming to form an article of the desired configuration, either by extrusion or by molding. Orientation may also be carried out in the presence of the foaming agent. Alternately, foaming agents are readily incorporated into a mass of polymer or resinous particles by admixing a foaming agent therewith and subsequently malaxating under heat and pressure to form an article of desired configuration. Foaming and orientation are accomplished by extrusion and orientation under a pressure sufficient to prevent foam formation in the article.

Oftentimes, it is beneficial, particularly when liquid or fluid foaming agents are employed, to incorporate the foaming agents are employed, to incorporate the foaming agent within the thermoplastic resin or polymer while it is in a heat plastified condition and contained within a heat fabricating device such as an extruder. Liquid gases or even particulate flowing agents are readily added to heat a plastified mass of resin and mixed uniformly throughout prior to fabrication of the oriented article. Alternately, the article may be fabricated by extrusion or molding, oriented to the desired degree and subsequently treated under pressure with a suitable foaming agent such as carbon dioxide which is a poor solvent or substantially a non-solvent for the polymer. The foaming agent in the presence of the molecularly oriented polymeric body will permeate throughout the body and on subsequent heating of the body, foaming will occur.

It is critical and essential to the practice of the present invention that the oriented synthetic resinous thermoplastic bodies be molecularly oriented if such bodies are not oriented, uncontrolled expansion in three dimensions occurs. In general, the degree of molecular orientation required within a body can be determined by orienting a body, heating the body above the thermoplastic temperature, determining the percent of shrink or shrinkage of the body, taking an unoriented body, incorporating a desired level of foaming or raising agent expanding the body and noting the linear increase in dimension thereof. If the shrinkage of the unfoamed body and the degree of expansion of the foamed body are approximately equal, the correct amount of orientation for monoaxial expansion is present and the correct amount of foaming agent for the particular degree of orientation is present. A sheet containing the desired amount of foaming agent and the desired degree of orientation will expand generally only in thickness and not in length or in width. In practice, precise balance of such characteristics are not necessary, for example, in a pressure forming operation wherein the sheet is restrained about the edge portions while being heated, a degree of orientation may be employed which results in shrinkage in length and width of an unrestrained sheet as such shrinkage is not permitted by the clamping arrangement employed. The sheet on being heated and foamed remains tight within the frame or restrained and does not sag or give undesired wrinkles or have undesired contact with the mold prior to the application of pressure or vacuum. Similarly, when a tubular item such as an oriented parison for a bottle or a foamable biaxially oriented tube is prepared which is to be molded such as by a blow molding process, expansion of the parison is not readily tolerated and is objectionable as contact with a heating mandrel is lost and heat transfer to the parison is reduced. Also, in some instances, it is desirable to impart sufficient orientation to a tubular wall such that the diameter decreases somewhat on foaming as in instances where a foamable or insulation material is being disposed about a cylindrical or even a tapered body. Shrinkage on foaming reduces somewhat the degree of expansion but permits the article to foam, contract in diameter and conform closely to the external dimensions of the article being covered such as a pipe, cup or similar substrate.

Further features and advantages of the present invention will become more apparent from the following specification when taken in connection with the drawing wherein:

FIG. 1 is a schematic representation of a foamable body in accordance with the invention selectively foamed.

FIG. 2 is a view of a section of a foamed sheet prepared in accordance with the invention.

FIG. 3 is a view of a generally cylindrical multiaxial molecularly oriented body in accordance with the invention.

FIG. 4 is a formed, foamed molded body in accordance with the invention.

FIG. 5 is a schematic representation of a multilayer sheet, part of which is foamed.

In FIG. 1 there is illustrated a partially foamed body in accordance with the present invention generally designated by the reference numeral 10. The body 10 has a tray or container-like configuration having a first major surface 11 and a second major surface 12. The body 10 is composed of biaxially oriented synthetic resinous thermoplastic material having a foaming agent disposed therein. The body 10 has been formed from a flat sheet by thermoforming means. The body 10 comprises a bottom 13, sides 14, 15, 16 and 17 forming a generally rectangular tray. The body 10 has a plurality of unfoamed portions 18, 19, 20, 21, 22 and 23, the remaining portion of the body 24 being foamed. The body of FIG. 1 is readily formed from a foamable sheet in accordance with the present invention by selectively heating a flat foamable sheet in the regions where foaming is desired until the temperature of the body is sufficient for foaming and thermoforming. Vacuum or pressure is then applied to conform the partially heat plastified and partially foamed sheet into the desired configuration. Such selective foaming is readily accomplished in a conventional vacuum forming apparatus by providing a heating platen with masks generally corresponding to the unfoamed area or alternately by selectively impregnating a sheet of biaxially oriented material with blowing agents wherein the unfoamed areas are masked during the impregnation operation to prevent entrance of the blowing agents. Alternately, such a body is formed by impregnating the entire sheet and masking the areas in which foaming is desired by means of a suitable gas barrier to prevent escape of the blowing agent and permitting the blowing agent to escape from the unmasked portion. Suitable gas barriers are metallic tapes or gas barrier synthetic resins such as vinylidene chloride polymers containing at least about 70 weight percent vinylidene chloride.

Employing latex coating of the molecularly oriented sheet prior to foaming results in a foam sheet having gas barrier properties which are not readily achieved by other techniques. For example, when a barrier coating such as a vinylidene chloride polymer is applied to one or both surfaces the biaxially oriented sheet and the sheet subsequently foamed (impregnation is accomplished either before or after coating) the integrity of the coating is maintained in the foamed form. Alternately, if a foam sheet is prepared and the foam sheet is coated by conventional coating techniques with a barrier coating using conventional doctoring means, an uneven coating is obtained which either requires an excessive amount of coating material or results in inadequate barrier properties because of the non-uniformity and oftentimes loss of integrity of the coating when doctoring devices are employed. Thus, sheet in accordance with the present invention having a gas or moisture barrier on the surface presents a substantial and significant advantage over foam sheet which is first formed and subsequent coated.

Expendable sheets in accordance with the invention which expand selectively may be prepared by either preventing entrance of a volatile fluid foaming agent into selected portions of the sheet by means of a barrier coating applied prior to impregnation or by applying a barrier coating after impregnation and selectively preventing the escape of the fluid foaming agent. Generally, fluid foaming agents diffuse into or out of the sheet or body at rates peculiar to a particular foaming agent and the composition of the sheet. Thus, by selecting an appropriate time, portions of the sheet are selectively foamed.

By way of illustration, if a sheet of given thickness of, for example, polystyrene is coated with a vinylidene chloride polymer on one side, the entire sheet may readily be foamed. However, assuming that the vinylidene chloride polymer is a barrier for the particular foaming agent employed, such as carbon dioxide for a given thickness of sheet, the sheet will require about twice the length of time to become impregnated with carbon dioxide or the fluid foaming agent as would a sheet having no coating. A barrier coating as a synthetic resin has a finite permeability to blowing agents and an indefinite exposure of a selectively masked sheet to impregnation conditions results in uniform impregnation of the sheet. Indefinite exposure of a masked impregnated sheet to conditions which would cause the volatile fluid foaming agent to be removed from the sheet results in no foaming. However, for practical purposes, when using highly volatile foaming agents, suitable times are employed which are readily calculated employing known permeability or diffusion data.

In FIG. 2 there is depicted a greatly enlarged foamed sheet portion 25. The foamed sheet portion 25 has a first surface 26 of a generally continuous non-cellular nature. The body 25 has a second surface 27 similar to the surface 26 and of a continuous non-foamed nature. A core 28 is disposed between the surfaces 26 and 27. The core 28 comprises a plurality of thin membranes 29 defining a plurality of closed cellular spaces 30.

In FIG. 3 there is depicted a body 35 in accordance with the invention. The body 35 has a generally cylindrical or narrowly tapering frustoconical configuration. The body 35 has a wall portion 36, an inner surface 37 and an outer surface 38. The body 35 is composed of a multidirectionally molecularly oriented synthetic resinous material containing a foaming or raising agent. The body 35 has an opening or upper end 39 and a closed or lower end 40. The direction of molecular orientation adjacent the surfaces of the body is indicated by the arrows disposed on the surfaces 37 and 38. Beneficially, the oriented foamable body such as the body 35 is beneficially prepared by rotary molding hereinbefore described wherein the orientation of the synthetic resinous material occurs within a mold having rotating surfaces which rotate as the material cools below its thermoplastic temperature.

In FIG. 4 there is shown a container 35a. The container 35a defines an internal cavity 41 and a wall portion 36a of foamed synthetic resinous material. The container 35a is obtained from the body of FIG. 3 by heating the body 35, causing it to foam, subsequently applying internal pressure within the body and causing it to conform to a mold of desired configuration.

In FIG. 5 there is depicted a partially foamed multilayer sheet generally designated by the reference numeral 45. The sheet 45 comprises an unfoamed portion 45a and a foamed portion 45b. In the unfoamed portion 45a are a plurality of layers 46 of synthetic resinous material interleaved with a plurality of layers 47 of diverse synthetic material. Incorporated within the sheet 45 is a foaming agent. The layers 46 and 47 are adhered to each other to form a unitary structure. The foamed portion 45b comprises a plurality of foamed layers 46a interleaved with the unexpanded layers 47.

A wide variety of shapes and forms are readily prepared in accordance with the invention.

By way of further illustration, a plurality of sheets of polystyrene are prepared which are biaxially oriented by a tentering process and on heating, shrink 62.5 percent in the transverse direction and 62.5 percent in the machine direction and treated with solid carbon dioxide at 800 pounds per square inch gauge for 25 minutes. The temperature external to the uninsulated metal pressure vessel was 35° C. The carbon dioxide-treated biaxially oriented sheets were determined to have absorbed 5.0 percent carbon dioxide based on the weight of the untreated polystyrene sheet. A pressure forming apparatus comprising an 8⅝ inch and 10⅝ inch heat platen and operated with compressed air is fitted with an 8 inch by 5½ inch meat tray mold. The pressure forming apparatus has provision to apply about 100 pounds per square inch to one face of the sheet and a vacuum up to 26 inches to the opposite face of the sheet. By employing a heating platen temperature of about 280° F., forming air pressure of 60 pounds per square inch, a heating time of three seconds and a forming time of 1.5 seconds, excellent meat trays were obtained wherein the wall of the trays foamed to about three times their original thickness. No tendency was observed for the sheet during the heating cycle to sag or bag, but the sheets foamed in a parallel configuration.

Carbon dioxide impregnated sheets generally as set forth in the previous illustration were employed in a vacuum forming operation in thicknesses of from about 5 to 15 mils. A movable heating panel was disposed above the clamped sheet. Excellent forming was obtained with heating times between 7 and 14 seconds. At heating times less than 7 seconds, the sheet had not foamed and was not sufficiently heat plastified for vacuum forming, whereas at times greater than 14 seconds, the sheet sagged or ballooned and a tendency for the foam seals to collapse was observed. In each instance, foaming and forming the biaxially oriented polystyrene sheets, a thin unfoamed skin is observed on the surface and formed parts or unformed foam sheet has an attractive high gloss noncellular layer on the surface. A plurality of portions of 15 mil thick biaxially oriented polystyrene sheet was exposed to carbon dioxide for a period of 25 minutes at a temperature of 35° C. under a pressure of 800 pounds per square inch. The resultant sheet was removed from the pressurization vessel and subsequently positioned under a stencil formed of heavy white paper. A radiant heater was positioned adjacent the stencil until exposed portions of the sheet were observed to foam. The heater was removed and the partially foamed sheet permitted to cool. The exposed portions of the sheet were observed to show an opaque white cellular structure and the remaining portion of the sheet was transparent. The thickness of the foamed portion of the sheet was 82 mils. No evidence was observed which would indicate shrinkage in the plane of the sheet.

A plurality of portions of 15 mil thick biaxially oriented polystyrene sheet were masked by applying an aluminum foil tape having a pressure sensitive adhesive on one surface thereof. Selected portions of the sheets were masked and subsequently exposed to carbon dioxide for a period of 10 minutes at a pressure of 800 pounds per square inch. The treated sheet was removed from the pressurization vessel and immediately subjected to radiant heat sufficient to cause foaming. The areas which were covered by the aluminum foil tape did not foam, while the remainder of the sheets foamed.

A 15 mil thick biaxially oriented polystyrene sheet was exposed to carbon dioxide for a period of 25 minutes under a pressure of 800 pounds per square inch. The treated sheet was removed from the pressurization vessel and aluminum foil tape having a pressure sensitive adhesive thereon was immediately applied to selective portions of the surface. After a period of 16 hours, the tape was removed from the sheet and the sheet exposed to radiant heat. The portions which were covered by the aluminum foil tape foamed, while the remaining portion of the sheet remained clear and unfoamed. Generally similar results are obtained when aluminum tape is replaced by using a vinylidene chloride copolymer latex as a masking agent.

Polystyrene containing about 6 weight percent normal pentane is injection molded employing a rotary molding technique to provide a plurality of multidirectional molecularly oriented bodies such as the body 25 of FIG. 3 which are unfoamed. The bodies were 4 inches long with a 1½ inch average diameter and had a 2.5 degree wall taper toward the small and closed end. The average wall thickness is about 0.038 inch. The moldings were placed in a blow molding apparatus, heated and blow molded to form a bottle 4.5 inches in height and 3 inches in diameter. In a blow molding operation, the body was placed on a mandrel, vacuum applied to the mandrel to maintain the body in contact with the mandrel. The body and mandrel were then placed in a cylindrical heating oven having one open end for entrance of the mandrel and body. The mandrel had a temperature of 250° F., the bottom of the oven surrounding the mandrel and body had a temperature of 500° F. and the side wall of the oven had a temperature of 600° F. When the body was heated to a pressure forming temperature, the foamed body was immediately transferred to a mold and a pressure of 15 pounds per square inch applied to the internal surface of the body. Symmetrical bottles were obtained having a density of about 20 pounds per square foot. By reducing the pressure in the blowing operation to about 4 pounds per square inch, bottles having a wall density of 12 pounds per square inch were readily obtained.

A multi-layer biaxially oriented sheet having a thickness of 10 mils and consisting of 125 layers of equal thickness of alternating polyethylene and polystyrene were placed in carbon dioxide atmosphere at 35° C. under a pressure of 800 pounds per square inch gauge for a period of 30 minutes. At the end of this period, the sheet was removed and exposed to a temperature of about 28° C. and atmospheric pressure. The sheet expanded in thickness to about 250 mils within a very short period of time. The expanded sheet appeared to be formed of a plurality of bubbles as well as fine cells and expansion appears to be due at least in part to partial delamination of the layers in a random arrangement throughout the structure. The expanded sheet is somewhat translucent, has excellent heat insulating properties and is admirably suited for purposes of cushioning where resilience is desired. The sheet is found satisfactory for the preparation of insulated bags for frozen food, for cushioned package overwrap and is eminently suited as a structural moisture barrier and heat insulation, hot caps for plants to prevent freezing and to provide shade from direct sun light and for the preparation of temporary enclosures such as the storage of vegetables and the like.

By way of further illustration, a number of biaxially oriented sheets of various polymers were pressurized in carbon dioxide at a temperature of 35° C. for about one hour under a pressure of 800 pounds per square inch. The biaxially oriented sheets were subsequently removed and heated by means of radiant heat to a temperature sufficient to cause foaming. The results are set forth in the following table:

TABLE I

| Material | Foaming characteristics |
| --- | --- |
| Low density polyethylene, 5 mils in thickness | Foamed slightly. |
| Polypropylene, 10 mils in thickness | Do. |
| Polypropylene 100 mils in thickness | Foamed to a greater degree than the 10 mil sample. |
| Rigid polyvinyl chloride 10 mils in thickness | Foamed well with small uniform cells. |
| Rigid polyvinyl chloride, 15 mils in thickness | Foamed well with small cells. |
| One mil plasticized polyvinyl chloride film | Foamed well. |
| A film of a copolymer [1] | Foamed well with a leathery appearance and feel. |
| Ethyl cellulose, 10 mils in thickness | Relatively small foam volume with large cells. |
| Cellulose acetate, cellulose butyrate and cellulose propionate. | Each cellulose ester formed.[2] |
| 10 mil thick film of a copolymer [3] | Foams as polystyrene. |
| A polycarbonate resin [4] | Foamed well with small solids. |
| Oriented polystyrene 10 mils in thickness [5] | Foamed well with shrinkage at the coated surface. |

[1] 73 parts vinyl chloride and 27 parts vinylidene chloride plus about 5 weight percent plasticizer.
[2] Foaming greater in the propionate than in the butyrate and greater in the butyrate than in the acetate.
[3] 72 weight percent styrene and 28 weight percent acrylonitrile.
[4] Commercially available under the trade name of Lexan 20 mils in thickness.
[5] A vinylidene chloride copolymer on one surface pressurized with $CO_2$ for one hour at room temperature and 170 pounds per square inch gauge.

In a similar manner, other synthetic resinous thermoplastic materials which are multidirectional molecularly oriented are readily foamed including the condensation product of hexamethylenediamine and adipic acid and oriented films from linear polyesters such as the condensaton product of ethylene glycol and terephthalic acid.

A 10 mil biaxially oriented polystyrene sheet is coated on one side with 0.4 mil of a dry coating from an aqueous dispersion of a copolymer of 85 weight percent vinylidene chloride, 12 weight percent 2-ethyl hexyl acrylate and 3 weight percent acrylonitrile. A similar sheet is coated on each side to provide a dry coating of 0.2 mil to provide a total thickness of 0.4 mil. Each of the coated samples are treated in a $CO_2$ atmosphere at 170 pounds per square inch gauge at a temperature of about 30° C. for a period of one hour. The sheets are subsequently formed into a meat tray in a vacuum former and the oxygen transmission properties obtained in accordance with the American Society for Testing Materials Procedure D1434–56T. The results are set forth in the following table.

TABLE II

| Sample | Thickness (mils) | Average O transmission rate[1] |
|---|---|---|
| Sample coated 2 sides (0.2 mil vinylidene chloride polymer per side) | 10.4 | 0.236 |
| Sample coated 1 side (0.4 mil vinylidene chloride polymer): | | |
| Before foaming | 10.5 | 0.630 |
| After foaming (spl. 1) | 40.0 | 1.340 |
| After foaming (spl. 2) | 35.0 | 2.030 |
| Uncoated polystyrene: | | |
| Before foaming | 10.0 | 26.600 |
| After foaming | 80.0 | 28.000 |

[1] cc./100$^2$ in 2/24 hours/atm.

Bodies prepared in the hereinabove set forth illustrations appear to be substantially tougher and more rigid than foamed bodies prepared from non-oriented materials.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not be construed or interpreted as being restrictive or otherwise limiting of the present invention, excepting as it is set forth and defined in the hereto-appended claims.

What is claimed is:

1. An expandable synthetic resinous article comprising a multidirectionally molecularly oriented synthetic resinous body having molecular orientation in at least a first and second direction, the body being expandable in at least a third direction.

2. The body of claim 1 having the form of a sheet.

3. The body of claim 2 having a cup-like configuration and generally circumferential orientation.

4. The body of claim 1 which comprises a plurality of adherent layers of diverse synthetic resinous material.

5. A body comprising a formed sheet of multidirectionally molecularly oriented synthetic resinous material having a molecular orientation in a first and second direction and having selectively foamed portions in at least a third direction, said resinous material having a generally concave configuration.

6. The body of claim 5 having a bottom and side portions, the bottom and side portions defining edges, the edges of the side portions being remotely disposed from the bottom, the body being foamed adjacent the edges and a junction of the sides with the bottom and at junctions between the side, selected remaining portions of the body being in an unfoamed and transparent condition.

7. The body of claim 1 having disposed on at least one surface thereof a coherent gas barrier layer of an unfoamed synthetic resinous material.

8. The body of claim 7 wherein the gas barrier material contains at least about 75 weight percent vinylidene chloride copolymerized therein.

References Cited

UNITED STATES PATENTS

| 3,277,221 | 10/1966 | Parrish | 264—95 |
| 3,356,242 | 12/1967 | Cleereman | 264—95 |
| 3,409,495 | 11/1968 | Rasmussen | 161—402 |

WILLIAM J. VAN BALEN, Primary Examiner

U.S. Cl. X.R.

161—161, 402; 206—46; 215—1.5; 264—45